(12) United States Patent
Cohen et al.

(10) Patent No.: US 7,412,149 B2
(45) Date of Patent: Aug. 12, 2008

(54) TRICK MODE GENERATION IN VIDEO STREAMING

(75) Inventors: Noam Cohen, Binyamina (IL); Ofer Kruzel, Haifa (IL)

(73) Assignee: Bitband Technologies, Ltd., Netanya (IL)

( * ) Notice: Subject to any disclaimer, the term of this patent is extended or adjusted under 35 U.S.C. 154(b) by 715 days.

(21) Appl. No.: 10/978,215

(22) Filed: Oct. 28, 2004

(65) Prior Publication Data

US 2006/0093318 A1    May 4, 2006

(51) Int. Cl.
*H04N 5/91* (2006.01)

(52) U.S. Cl. .............................. 386/68; 386/70; 386/126

(58) Field of Classification Search ................... 386/45, 386/69, 70, 109–112, 124, 125, 46, 68
See application file for complete search history.

(56) References Cited

U.S. PATENT DOCUMENTS

| | | | |
|---|---|---|---|
| 5,771,335 A | 6/1998 | Lee | |
| 5,973,679 A | 10/1999 | Abbott et al. | |
| 6,057,832 A | 5/2000 | Lev et al. | |
| 6,065,050 A | 5/2000 | DeMoney | |
| 6,327,421 B1 | 12/2001 | Tiwarski et al. | |
| 6,389,218 B2 | 5/2002 | Gordon et al. | |
| 6,445,738 B1 | 9/2002 | Zdepski et al. | |
| 6,510,554 B1 | 1/2003 | Gordon et al. | |
| 6,601,136 B2 | 7/2003 | Gunaseelan et al. | |
| 6,654,669 B2 | 11/2003 | Eisenmann et al. | |
| 6,654,933 B1 | 11/2003 | Abbott et al. | |
| 6,738,980 B2 | 5/2004 | Lin et al. | |
| 6,754,443 B2 | 6/2004 | Nelson et al. | |
| 6,760,536 B1 | 7/2004 | Amir et al. | |
| 7,149,410 B2 * | 12/2006 | Lin et al. | 386/68 |
| 7,218,635 B2 * | 5/2007 | Haddad | 370/394 |
| 2002/0015576 A1 | 2/2002 | Gordon et al. | |
| 2002/0120942 A1 | 8/2002 | Avison | |
| 2003/0077071 A1 | 4/2003 | Lin et al. | |
| 2004/0223739 A1 * | 11/2004 | Suzuki et al. | 386/95 |

OTHER PUBLICATIONS http://www.chiariglione.org/mpeg/standards.htm, 2005. (p. 1-8).
H. Schulzrinne, et al., "Real Time Streaming Protocol (RTSP)" Apr. 1998. (p. 1-81).

* cited by examiner

*Primary Examiner*—Thai Tran
*Assistant Examiner*—Mishawn Dunn
(74) *Attorney, Agent, or Firm*—Hoffman, Wasson & Gitler, PC

(57) ABSTRACT

A method for generating a trick replay video stream, including the steps of: selecting from stored data adapted for transmission as a streamed movie a sequence of Intracoded frames (I-frames), and inserting one or more difference frames between consecutive I-frames of the sequence to form the trick replay video stream. Each of the difference frames is constructed to have a zero difference with respect to a preceding I-frame in the sequence. The method further includes transmitting the trick replay video stream to a decoder for display of the streamed movie at an enhanced perceived rate.

30 Claims, 8 Drawing Sheets

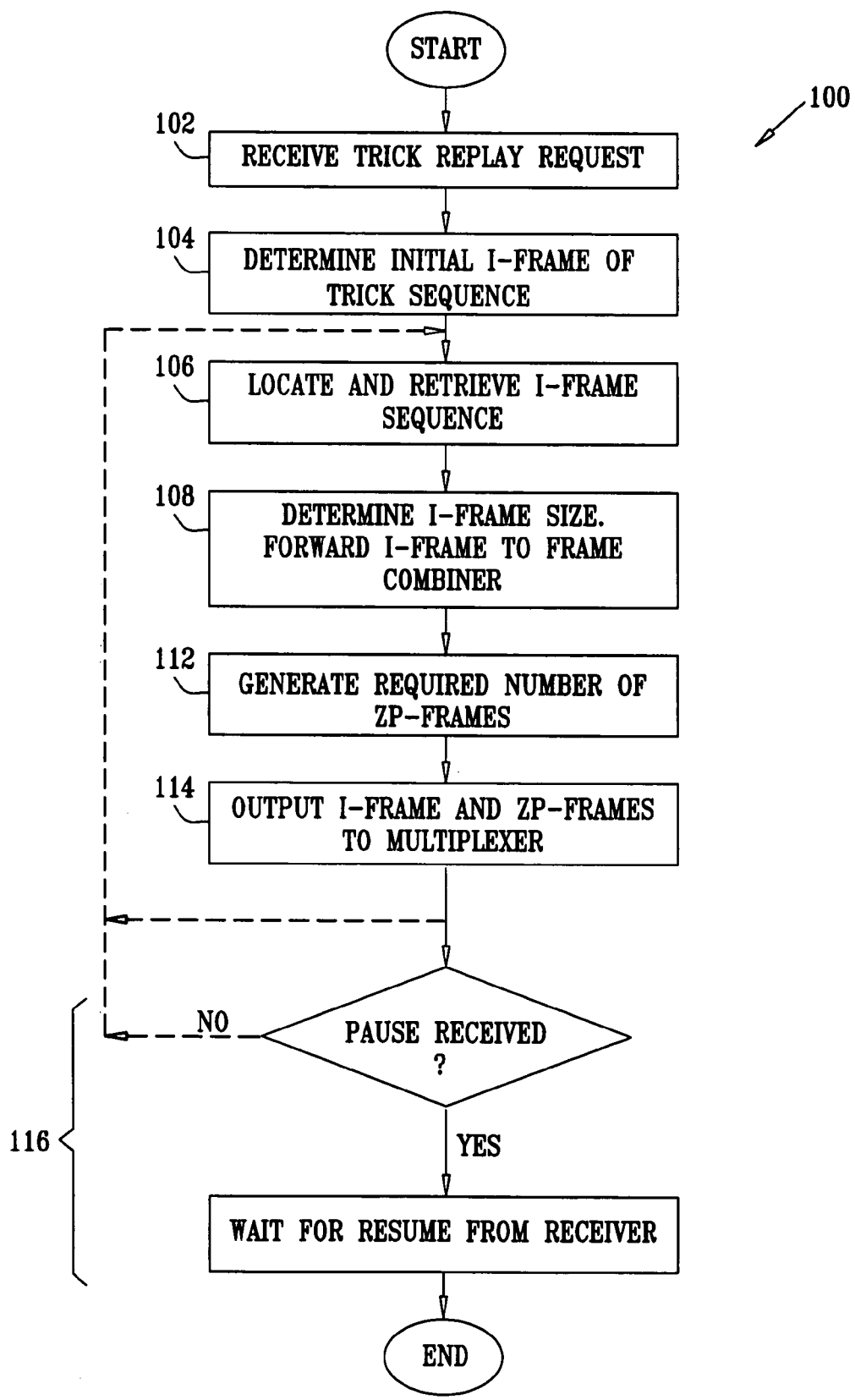

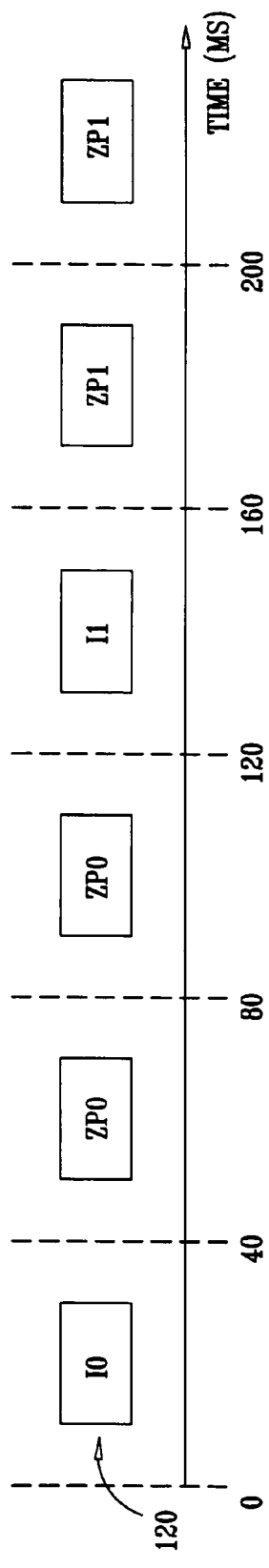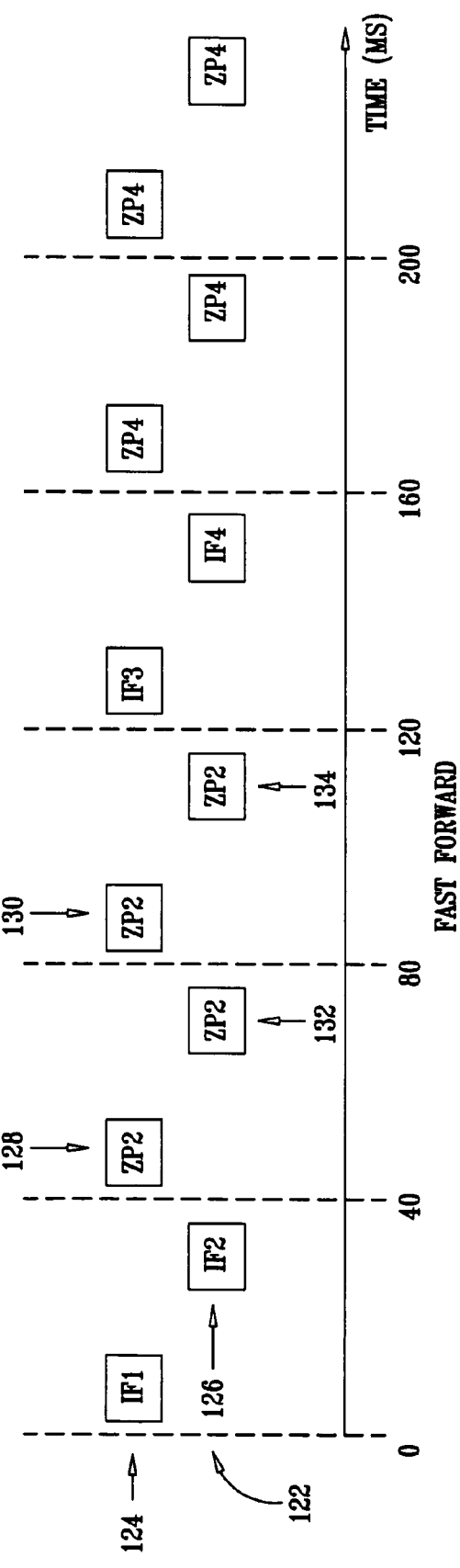

FAST REVERSE

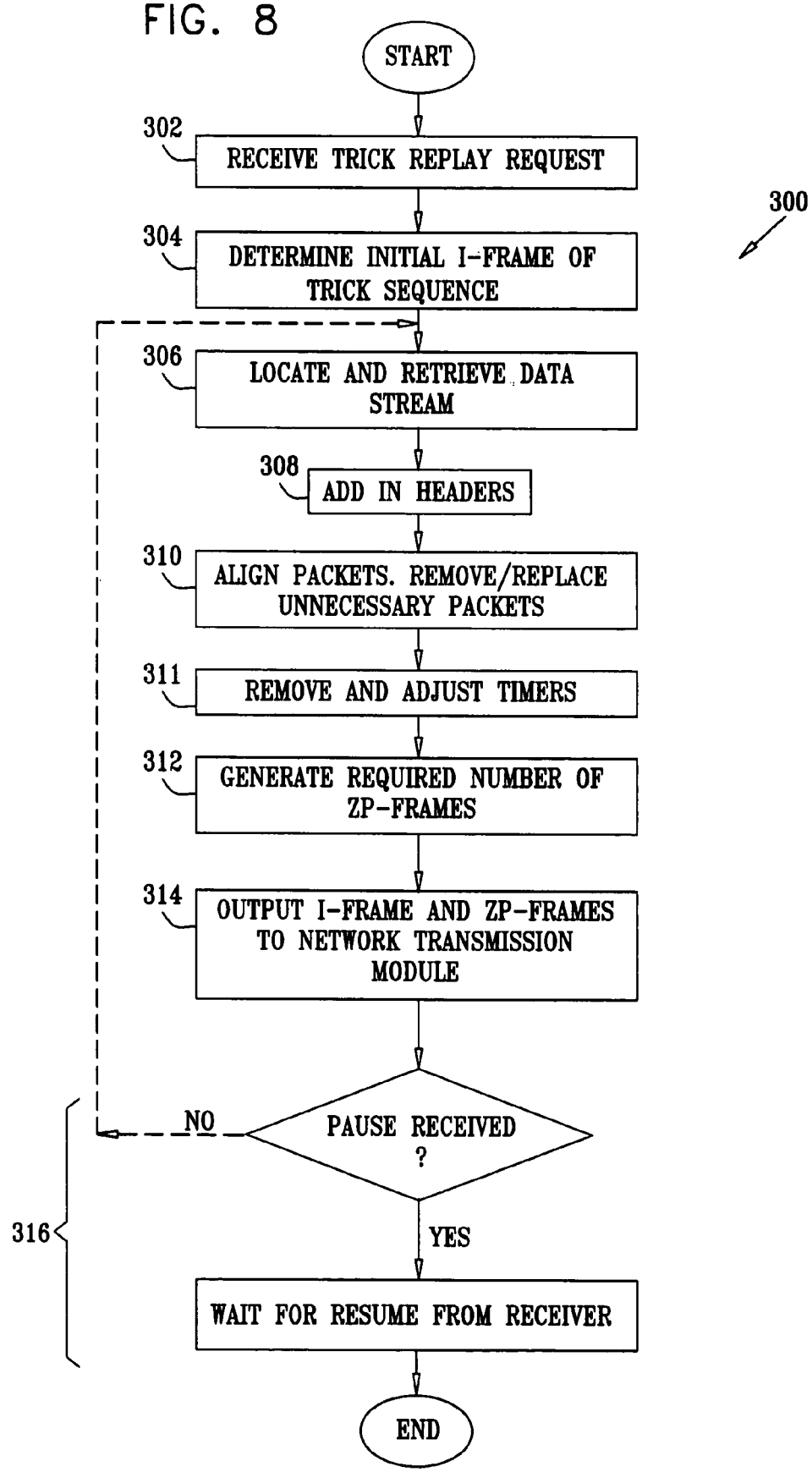

TRICK MODE GENERATION IN VIDEO STREAMING

FIELD OF THE INVENTION

The present invention relates generally to transmission of streamed data, and specifically to transmission of fast forward or reverse streamed data.

BACKGROUND OF THE INVENTION

The advent of tape recorders for playback of both audio and video material enabled users of the recorders to easily and quickly scroll forward or backward, using "fast forward" and "fast reverse" modes, as well as using a "standard play" mode. The ability to fast forward and reverse is thus a highly desirable feature for video that is streamed.

Streamed movies with video and audio, such as movies produced according to one of the Moving Picture Experts Group (MPEG) standards, comprise Intracoded frames (I-frames), which are substantially self-contained images. The streamed movies also includes Predictive frames (P-frames), which incorporate differences from a prior frame, and Bidirectional frames (B-frames) which incorporate differences from a prior and a subsequent frame. MPEG standards may be found at www.chiariglione.org/mpeg/standards.htm.

The MPEG-2 (part 1) standard defines how a video elementary stream, an audio elementary stream, and other data elementary streams are to be multiplexed. Hereinbelow, a video elementary stream is also referred to as a video stream, and an audio elementary stream is also referred to as an audio stream. Each elementary stream is a byte stream which is broken up into variable-length packets, forming a packetized elementary stream (PES). The standard provides two methods for delivering the PESs.

In a first method of delivery, termed a program stream, the PES packets are multiplexed and are organized into units termed "packs." Program streams are designed for relatively error-free environments. In a second method of delivery, termed a transport stream, the PES packets are further packaged inside fixed-sized transport stream packets. Transport streams are designed for unreliable environments. Either method may be used to deliver streamed movies which may be transmitted using a Real-Time Transport Protocol (RTP), described in Request for Comments (RFC) 1889. Communication between a provider and a receiver of a streamed movie is typically according to a Real-Time Streaming Protocol (RTSP), which is described in RFC 2326. RFC 1889 and RFC 2326 are published by the Internet Engineering Task Force, and may be found at www.ietf.org/rfc.

A number of processes are known for enabling fast forward and reverse modes, also termed trick replay modes, to be generated for streamed movies. U.S. Patent Application Publication 2003/0077071 to Lin, et al., whose disclosure is incorporated herein by reference, describes a method for trick mode playback of an MPEG video recording, using an information file giving locations of I-frames. The method selects stored progressive or non-progressive frames to be incorporated into the playback.

U.S. Patent Application Publication 2002/0120942 to Avison, whose disclosure is incorporated herein by reference, describes a trick mode method using an MPEG video stream and also an altered format stream derived from the MPEG stream.

U.S. Pat. No. 6,389,218 and U.S. Patent Application Publication 2002/0015576 to Gordon, et al., whose disclosures are incorporated herein by reference, describe an "all-in-one" encoder that produces MPEG fast forward, fast reverse and play streams from video frames.

U.S. Pat. No. 6,760,536 to Amir, et al., whose disclosure is incorporated herein by reference, describes a method for analyzing digital video to produce a content-based variable-rate play back sequence for fast forward or reverse browsing.

U.S. Pat. No. 6,760,536 to U.S. Pat. No. 6,738,980 Lin, et al., whose disclosure is incorporated herein by reference, describes a method for producing fast forward and reverse modes for a video stream. The method comprises storing and retrieving forward-encoded and reverse-encoded bit streams for the video stream.

U.S. Pat. No. 6,510,554 to Gordon, et al., whose disclosure is incorporated herein by reference, describes a method for generating an information sub-stream from an MPEG stream. The information sub-stream may be used as a fast forward and reverse stream.

U.S. Pat. No. 6,445,738 to Zdepski, et al., whose disclosure is incorporated herein by reference, describes a method for processing an initial MPEG stream into an MPEG video stream suitable for trick replay. The processed MPEG video stream has reduced storage and bandwidth requirements, generated by removing a portion of the frames of the initial MPEG stream.

U.S. Pat. No. 6,327,421 to Tiwari, et al., whose disclosure is incorporated herein by reference, describes storing a subsequence of an original MPEG sequence for use in servicing fast forward and reverse requests.

U.S. Pat. No. 6,065,050 to DeMoney, whose disclosure is incorporated herein by reference, describes a method for indexing between video streams. A first stream may be a standard play rate stream, a second stream may be a trick play stream.

U.S. Pat. No. 6,057,832 to Lev, et al., whose disclosure is incorporated herein by reference, describes a method for storing a video stream as I-frames and other frames. On receipt of a trick replay request, only the I-frames are displayed.

U.S. Pat. No. 5,771,335 to Lee, whose disclosure is incorporated herein by reference, describes a method for fast forward and reverse of an MPEG stream. The method comprises preparing an I-frame table and incrementing or decrementing in the table for the forward or reverse streams. The increment or decrement gives a size of a video packet to be transmitted, and the packet is configured to always contain an I-frame.

SUMMARY OF THE INVENTION

In embodiments of the present invention, a trick replay video stream, typically a trick replay MPEG video stream, is generated. Data which is adapted for transmission as a streamed movie is stored on a storage medium such as a disk, and stored I-frames within the movie are indexed in a table. On receipt of a request for the trick replay video stream, a processor locates and selects a sequence of the stored I-frames to be used in the trick replay stream, typically by using the table. The processor also generates difference frames having zero differences, such frames herein being termed ZP-frames, and typically inserts one or more of the ZP-frames between consecutive I-frames of the sequence to form the trick replay video stream. Because the ZP-frames represent zero differences from the respective, preceding I frames, the ZP-frames add only a small volume of data to the video stream. On viewing, the trick replay video stream is perceived as though it were a fast forward or reverse sequence generated using all or some of the frames of the streamed movie. Thus, insertion of ZP-frames into a sequence of I-frames provides a simple and efficient method for generating a good quality trick replay stream.

The number of ZP-frames inserted between consecutive I-frames may be varied by the processor in order to vary a perceived rate of motion of the viewed video stream. The trick replay video stream is typically transmitted at a controlled data bit rate, although in some embodiments the data bit rate may vary. If required, the size of the ZP-frames may also be varied. The capability of adjusting the number and the size of the inserted ZP-frames enables the processor to meet the fixed data rate requirement, and also to easily and simply generate the trick replay video stream for different fast forward or reverse rates.

Furthermore, typical MPEG decoders work at a fixed frame rate and have a limited buffer size. Insertion of ZP-frames between consecutive I-frames, as is provided for by embodiments of the present invention, enables good quality trick replay streams to be transmitted and decoded, while ensuring that the decoder buffer neither underflows nor overflows.

Typically, the only substantial difference between fast forward and fast reverse video streams having the same rate is that in the former the I-frames increment, whereas in the latter the I-frames decrement.

Embodiments of the present invention are able to generate fast forward and fast reverse video streams from interlaced movies, the generated streams being free from annoying video vibration, unlike systems described in the prior art.

There is therefore provided, according to an embodiment of the present invention, a method for generating a trick replay video stream, including:

selecting from stored data adapted for transmission as a streamed movie a sequence of Intracoded frames (I-frames);

inserting one or more difference frames between consecutive I-frames of the sequence to form the trick replay video stream, each of the difference frames having a zero difference with respect to a preceding I-frame in the sequence; and transmitting the trick replay video stream to a decoder for display of the streamed movie at an enhanced perceived rate.

The method typically includes performing the steps of selecting the sequence, inserting the one or more difference frames, and transmitting the trick replay video stream in response to a command from the decoder. The command may include a scale factor indicative of the enhanced perceived rate, and the method may include determining a number of the one or more difference frames in response to the scale factor. Typically, the trick replay video stream includes a choice of a fast forward sequence and a fast reverse sequence, and the command includes a parameter indicative of the choice.

In one embodiment, the method includes transmitting the trick replay video stream at a controlled rate.

In a disclosed embodiment, inserting the one or more difference frames includes determining a number of the difference frames in response to a bit rate of transmission of the trick replay video stream.

In an alternative embodiment, inserting the one or more difference frames includes determining a number of the difference frames in response to a size of the preceding I-frame.

Selecting the sequence of I-frames may include generating a table indicative of locations of the I-frames, and reading the table to locate the sequence.

The method may further include adding a prerecorded trick replay audio stream to the trick replay video stream to form a combined stream, wherein transmitting the trick replay video stream includes transmitting the combined stream to the decoder.

In a further alternative embodiment, the one or more difference frames are selected from at least one predictive frame (P-frame) and at least one bidirectional frame (B-frame).

Typically, inserting the one or more difference frames includes determining a number of the difference frames in response to a buffer comprised in the decoder.

In another embodiment, each of the I-frames includes a first interlaced field and a second interlaced field, and inserting the one or more difference frames includes inserting a sequence of interlaced difference frames having a zero difference with respect to one of the first and the second interlaced fields.

Typically, the first interlaced field is displayed before the second interlaced field, and inserting the sequence of interlaced difference frames includes:

inserting a single first difference frame having a zero difference with respect to the second interlaced field after the second interlaced field; and inserting one or more consecutive difference frames having a zero difference with respect to the second interlaced field after the single first difference frame.

Alternatively or additionally, the first interlaced field is displayed after the second interlaced field, and inserting the sequence of interlaced difference frames includes:

inserting a single first difference frame having a zero difference with respect to the first interlaced field after the first interlaced field; and inserting one or more consecutive difference frames having a zero difference with respect to the first interlaced field after the single first difference frame.

The stored data may include a plurality of I-frames, and the method may include processing an initial movie to generate the plurality of the I-frames and to generate respective indexes of the I-frames. Typically, selecting the stored data includes referring to the indexes of the I-frames.

There is further provided, according to an embodiment of the present invention, apparatus for generating a trick replay video stream, comprising:

a storage medium wherein is stored data adapted for transmission as a streamed movie; and a processor which is adapted to:

select from the stored data a sequence of Intracoded frames (I-frames), insert one or more difference frames between consecutive I-frames of the sequence to form the trick replay video stream, each of the difference frames having a zero difference with respect to a preceding I-frame in the sequence, and transmit the trick replay video stream to a decoder for display of the streamed movie at an enhanced perceived rate.

Typically, the processor is adapted to perform the steps of selecting the sequence, inserting the one or more difference frames, and transmitting the trick replay video stream in response to a command from the decoder, wherein the command includes a scale factor indicative of the enhanced perceived rate. The apparatus may be configured to determine a number of the one or more difference frames in response to the scale factor. The trick replay video stream typically includes a choice of a fast forward sequence and a fast reverse sequence, and the command includes a parameter indicative of the choice.

In one embodiment the processor is adapted to transmit the trick replay video stream at a controlled rate.

Inserting the one or more difference frames may include determining a number of the difference frames in response to a bit rate transmission of the trick replay video stream. Alternatively or additionally, inserting the one or more difference frames includes determining a number of the difference frames in response to a size of the preceding I-frame.

In an alternative embodiment, selecting the sequence of I-frames includes storing a table indicative of locations of the I-frames in the storage medium, and the processor is adapted to read the table to locate the sequence.

The processor may be adapted to add a prerecorded trick replay audio stream to the trick replay video stream to form a combined stream, and transmitting the trick replay video stream may include transmitting the combined stream to the decoder.

In a further alternative embodiment, the one or more difference frames are selected from at least one predictive frame (P-frame) and at least one bidirectional frame (B-frame).

Typically, inserting the one or more difference frames includes determining a number of the difference frames in response to a buffer comprised in the decoder.

In a disclosed embodiment each of the I-frames includes a first interlaced field and a second interlaced field, and inserting the one or more difference frames includes inserting a sequence of interlaced difference frames having a zero difference with respect to one of the first and the second interlaced fields.

Typically, the first interlaced field is displayed before the second interlaced field, and inserting the sequence of interlaced difference frames includes:

inserting a single first difference frame having a zero difference with respect to the second interlaced field after the second interlaced field; and inserting one or more consecutive difference frames having a zero difference with respect to the second interlaced field after the single first difference frame.

Alternatively, the first interlaced field is displayed after the second interlaced field, and inserting the sequence of interlaced difference frames includes:

inserting a single first difference frame having a zero difference with respect to the first interlaced field after the first interlaced field; and inserting one or more consecutive difference frames having a zero difference with respect to the first interlaced field after the single first difference frame.

The stored data may include a plurality of I-frames, and the processor may be adapted to process an initial movie to generate the plurality of the I-frames and to generate respective indexes of the I-frames. Typically, selecting the stored data includes referring to the indexes of the I-frames.

There is further provided, according to an embodiment of the present invention, a method for generating a trick replay video stream, including:

selecting from stored data adapted for transmission as a streamed movie at a controlled bit rate a sequence of Intracoded frames (I-frames);

generating one or more difference frames having a zero difference with respect to a preceding I-frame in the sequence;

inserting between consecutive I-frames of the sequence, in response to the controlled bit rate, zero or more of the difference frames to form the trick replay video stream; and transmitting the trick replay video stream to a decoder for display of the streamed movie at an enhanced perceived rate.

There is also provided, according to an embodiment of the present invention, apparatus for generating a trick replay video stream, including:

a storage medium wherein is stored data adapted for transmission as a streamed movie at a controlled bit rate; and a processor which is adapted to:

select from the stored data a sequence of Intracoded frames (I-frames), generate one or more difference frames having a zero difference with respect to a preceding I-frame in the sequence, insert between consecutive I-frames of the sequence, in response to the controlled bit rate, zero or more of the difference frames to form the trick replay video stream, and transmit the trick replay video stream to a decoder for display of the streamed movie at an enhanced perceived rate.

The present invention will be more fully understood from the following detailed description of the embodiments thereof, taken together with the drawings, a brief description of which follows.

BRIEF DESCRIPTION OF THE DRAWINGS

FIG. 4 is a flowchart showing steps performed by the processing unit in forming a trick replay sequence, according to an embodiment of the present invention;

FIGS. 5A and 5B show schematic timing diagrams of interlaced and non-interlaced frames generated for a fast forward trick replay sequence, according to an embodiment of the present invention;

FIG. 8 is a flowchart showing steps performed by in operating the generator of FIG. 7, according to an embodiment of the present invention.

DETAILED DESCRIPTION OF EMBODIMENTS

Figure 1:
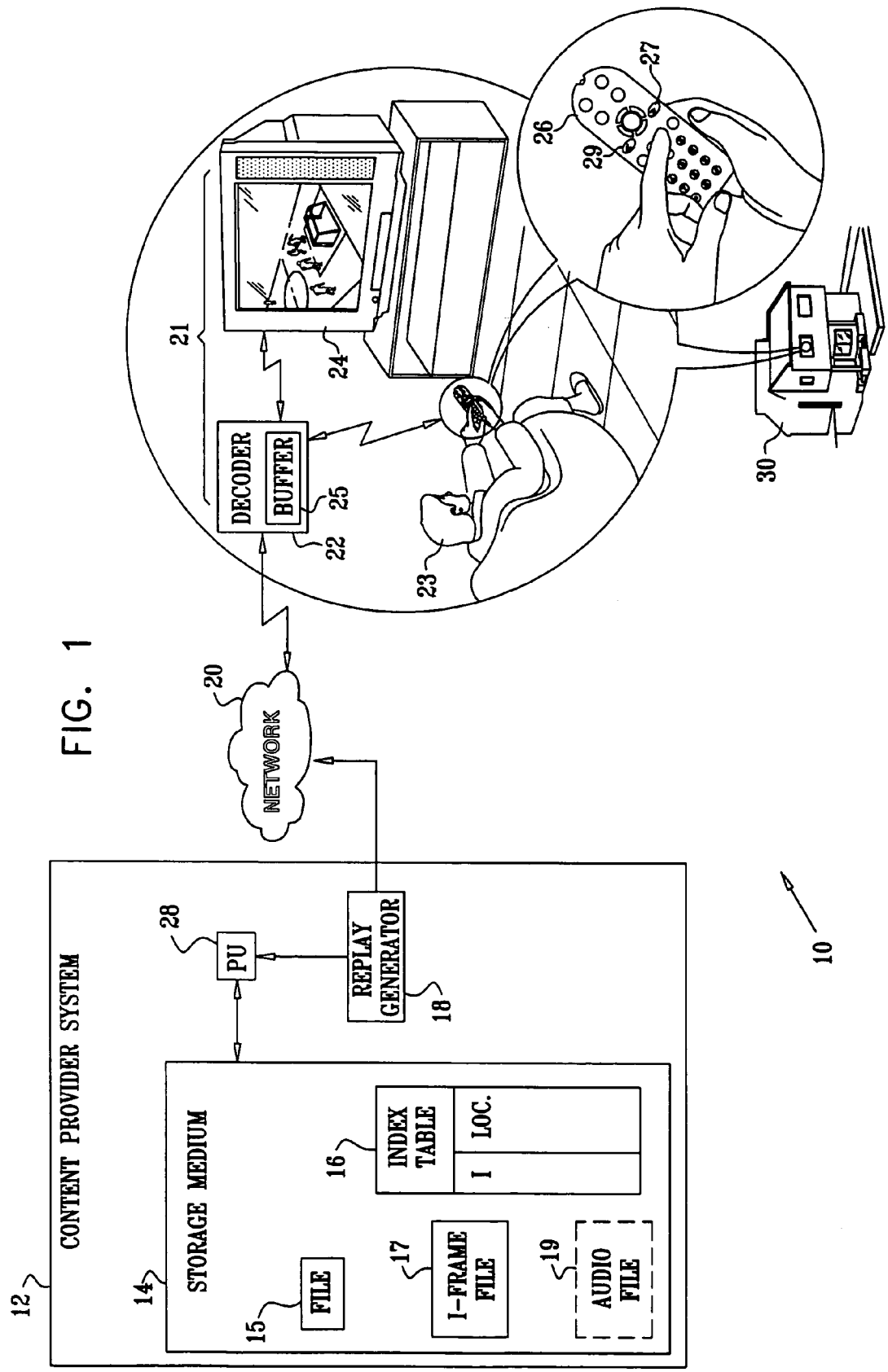
FIG. 1 is a schematic diagram illustrating a configuration for generating a trick replay video stream, according to an embodiment of the present invention.

Reference is now made to FIG. 1, which is a schematic diagram illustrating a configuration 10 for generating a trick replay video stream, according to an embodiment of the present invention. The following description assumes that the trick replay video stream is generated according to one of the Moving Picture Experts Group (MPEG) standards, which describe Intracoded frames (I-frames), Predictive frames (P-frames), and Bidirectional frames (B-frames). It will be appreciated, however, that the use of MPEG terms herein is for clarity and is purely by way of example, and that the principles of the present invention equally apply to video streams generated according to other protocols, such as a VC9 protocol published by Microsoft Corporation of Redmond, Wash., which may use other terms for their types of frames but wherein the frames have substantially similar properties to those listed above.

Thus, in the specification and in the claims, the term "Intracoded frame" is to be understood as comprising any frame that is a substantially self-contained image, the term "Predictive frame" is to be understood as comprising any frame incorporating differences from a previous frame, and the term "Bidirectional frame" is to be understood as comprising any frame incorporating differences between a previous and a subsequent frame. Also in the specification and in the claims, the term "difference frame" is to be understood as comprising a Predictive frame or a Bidirectional frame.

A content provider system 12 comprises a stable storage medium 14, typically consisting of one or more disks, from which content is to be provided as a video stream transmitted according to an MPEG format. As described in more detail below, system 12 generates the video stream in one of two encoded modes, using a replay generator 18. A first "standard replay" encoded mode is a mode wherein a receiver of the standard replay encoded mode presents the video stream at a frame rate so that viewed motion appears as normal. The frame rates for a standard replay mode transmission are typically chosen from 24, 25, 30, or 60 frames per second, although it will be appreciated that a standard replay mode transmission may comprise any other suitable frame rate. A second trick replay encoded mode is a mode wherein the receiver presents the received trick replay encoded mode video stream at an enhanced perceived rate, different from the standard replay rate, typically at a fast forward or a fast reverse rate.

In addition to generating the video stream in one of the two modes described above, system 12 may combine an audio stream with the video stream. System 12 then transmits the video stream, combined with the audio stream if the latter is present, as either a program stream or as a transport stream, depending on the type of connection between the system and a receiver 21. Generator 18 typically transmits the program or transport stream via a data transmission network 20 to receiver 21, in which case the processor encapsulates the stream according to an operating protocol of network 20, typically the real time protocol (RTP), published as RFC 1889 by the Internet Engineering Task Force (IETF). In some embodiments of the present invention, the program or transport stream is encrypted, by processes which are well known in the art, before being transmitted to receiver 21.

Typically, receiver 21 comprises a television 24 and a set-top decoder 22 situated at a location such as a home 30 of a viewer 23. The decoder receives, decodes, and if necessary decrypts the video stream, and supplies the decoded video stream to the television. Viewer 23 of receiver 21 is typically party to a service agreement which enables the viewer to generate the connection between the receiver and system 12, the connection delivering the video stream to a buffer 25 in the decoder, and also allowing the viewer to communicate by predetermined signals with system 12. Communication between decoder 22 and system 12 is herein assumed, by way of example, to be using the real-time streaming protocol (RTSP) published as RFC 2326 by the IETF. Viewer 23 typically selects and controls the receipt of the video stream via a remote control unit 26 which comprises, inter alia, a fast forward button 27 and a fast reverse button 29. Operating buttons of unit 26 causes set-top decoder 22 to generate and transmit respective predetermined signals of the RTSP.

System 12 stores video content that is to be formed into the video stream in one or more files, herein assumed by way of example to be a single file 15, on medium 14. File 15 typically comprises a system of audio and video data, the video data comprising I-frames interleaved with P- and/or B-frames according to an MPEG format. Typically, a file 17 comprising a copy of the I-frames of file 15 is also stored on medium 14. An audio file 19 may also be stored on medium 14. Files 17 and 19 are described in more detail below. A processing unit (PU) 28 operates system 12. As described with reference to FIG. 2 below, PU 28 generates an index table 16 of the I-frames in file 17, the table listing the I-frames and their respective locations within the file.

Figure 2:
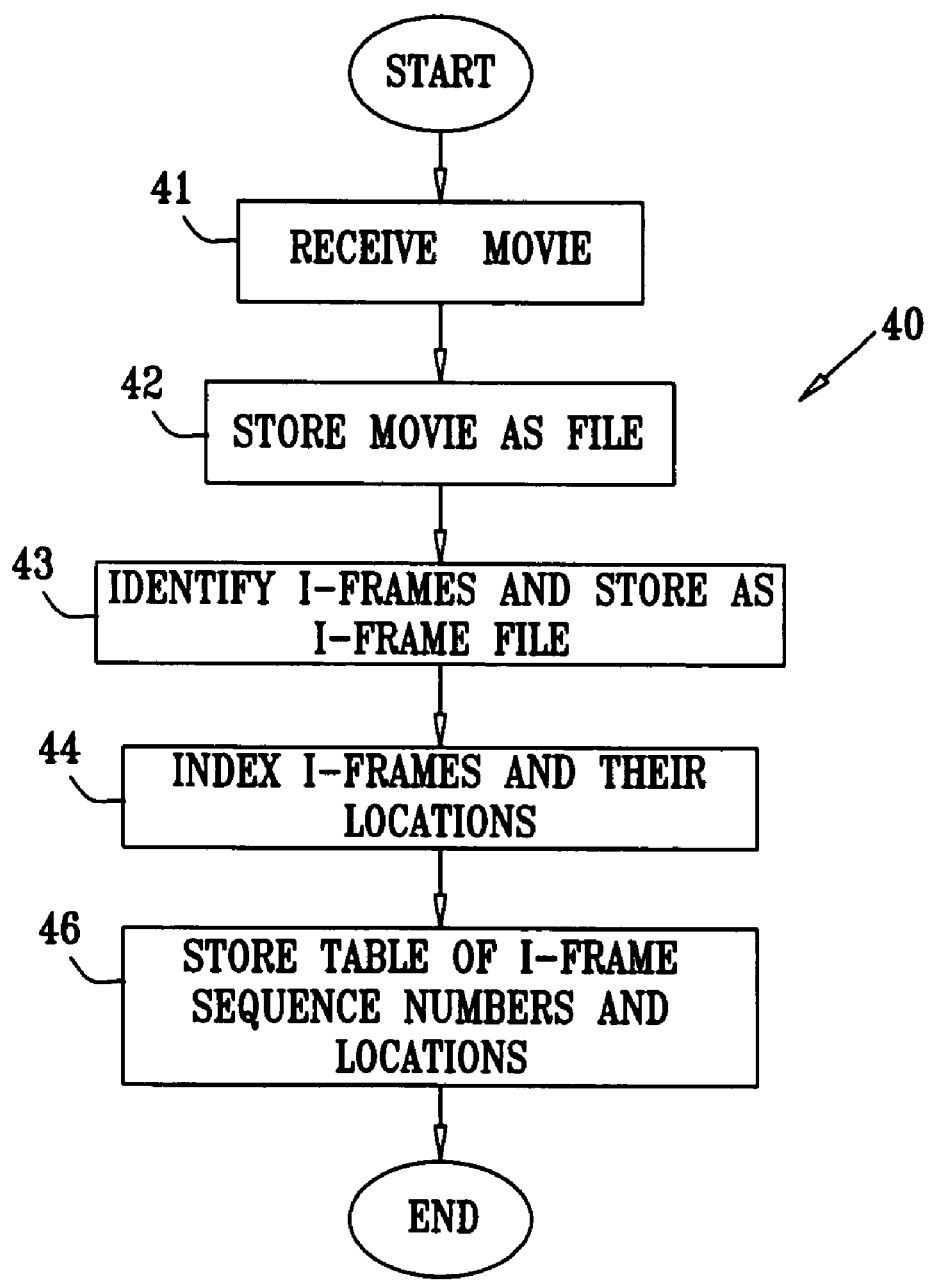
FIG. 2 is a flowchart showing steps performed by a processing unit of the configuration of FIG. 1, according to an embodiment of the present invention.

FIG. 2 is a flowchart 40 showing steps performed by PU 28 in generating table 16, according to an embodiment of the present invention. PU 28 typically generates table 16 at a time that file 15 is stored on medium 14, although the processing unit may generate the table at any other convenient time.

In an initial step 41, system 12 receives an MPEG movie stream. The movie stream may be from an already generated and formatted MPEG file, such as may be provided to system 12 by an electronic transmission over network 20 or by a direct connection, or from tangible media such as a CD-ROM, or by a combination of such processes.

In a storage step 42, system 12 stores the received movie stream as file 15.

In an identification step 43, PU 28 identifies I-frames of file 15 and generates and stores copies of the I-frames in a separate file 17.

In an indexing step 44, PU 28 determines a sequence number for each of the I-frames and a location in file 17 for the beginning of each I-frame stored in the file. Typically, PU 28 also determines a size of each respective I-frame, although the processing unit may determine the size later, as described below.

In a final step 46, PU 28 stores table 16, comprising the sequence numbers of each of the I-frames, corresponding locations of their beginnings, and sizes of the I-frames if the processing unit has determined these in step 44. Flowchart 40 then terminates. It will be appreciated that table 16 indexes the I-frames of file 17.

Alternatively, table 16 comprises a sub-set of the I-frames sequence numbers, and respective beginning locations and sizes. In one embodiment of the present invention, typically used to conserve storage space, every second I-frame of the received data is stored and indexed in table 16, rather than all the I-frames.

In an alternative embodiment of the present invention, PU 28 may be configured not to index or store certain I-frames, typically in order to maintain an approximately constant time between indexed and stored I-frames. While a typical movie stream may comprise I-frames separated by approximately 0.5 s, file 15 may comprise I-frames which occur more frequently, and/or irregularly. In this case, PU 28 may index and store I-frames of file 15 that occur approximately every 0.5 s, for example by counting the number of frames since the last I-frame, and ignoring those occurring less than 0.5 s from the last I-frame.

In a further alternative embodiment of the present invention, PU 28 stores a prerecorded audio file 19 on medium 14. Audio file 19 comprises sounds which replicate those made when a recorder replays recorded material at an enhanced perceived rate. As is described in more detail below, file 19 may be used when PU 28 generates trick replay video streams.

Figure 3:
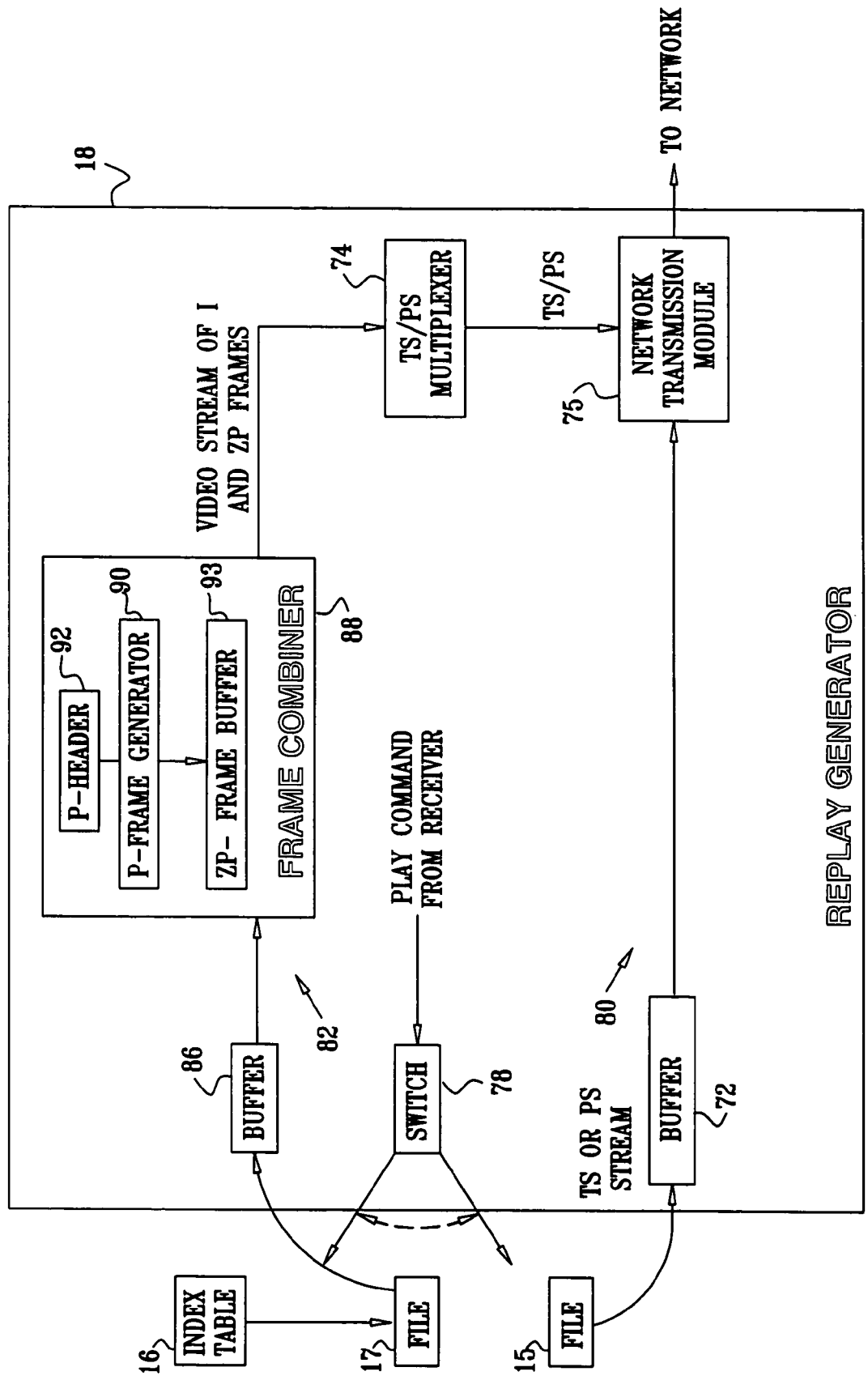
FIG. 3 is a schematic simplified block diagram of a replay generator of the configuration of FIG. 1, according to an embodiment of the present invention.

FIG. 3 is a schematic simplified block diagram of replay generator 18, according to an embodiment of the present invention. Generator 18 is operated by PU 28. Generator 18 provides a first path 80, also herein termed a standard replay path, and a second path 82, also herein termed a trick replay path, for generation of the video stream transmitted to receiver 21. A switch 78 toggles between the standard replay and the trick replay paths, the toggling being implemented by PU 28 on receipt from receiver 21 of one of the predetermined signals described above with respect to FIG. 1.

Path 80 is operative on receipt from receiver 21 of a standard rate PLAY command, which comprises a scale factor of +1. Typically, the command is used to view the movie corresponding to file 15 from its beginning. Alternatively, for example in the case where television 24 displays a scroll bar that enables viewer 23 to select a first frame other than the beginning frame, the PLAY command uses additional syntax that enables PU 28 to select the appropriate first frame. After receipt of the command, all audio and video data, starting from the first chosen frame of file 15, is transferred as a transport stream or as a program stream via a temporary storage buffer 72 to a network transmission module 75 which acts as an interface between generator 18 and network 20. Module 75 transmits its received stream to network 20.

To initiate a trick replay sequence for receiver 21, the receiver issues a PLAY command, comprising a positive or negative scale factor different from +1, to system 12. The absolute value of the scale factor gives the enhanced rate at which the stream is requested to be displayed. A positive scale factor greater than 1 indicates a request for a fast forward stream, a negative scale factor less than −1 indicates a request for a fast reverse stream. The PLAY command is typically generated by viewer 23 pressing fast forward button 27 or fast reverse button 29 on remote control 26. Alternatively or additionally, the PLAY command with the scaling factor is issued by an entity other than receiver 21. For example, an operator of system 12 may supply a speeded-up selection of file 15 to receiver 21 so that viewer 23 may preview the corresponding movie. On receipt of the PLAY command with the scale factor, hereinbelow termed a scaled PLAY command, switch 78 toggles replay generator 18 to operate path 82.

In operating path 82, processing unit 28 retrieves I-frames from file 17, the processing unit referring to table 16 to locate on medium 14 the I-frames that are to be retrieved. If the scaled PLAY command has a positive scale factor, PU 28 retrieves I-frames having ascending sequence numbers. If the scaled PLAY command has a negative scale factor, PU 28 retrieves I-frames having descending sequence numbers. The processing unit transfers the retrieved I-frames via a temporary storage buffer 86 to a frame combiner 88.

In frame combiner 88, PU 28 interleaves I-frames received from buffer 86 with one or more difference frames having a zero difference. Typically the difference frames are P-frames. Alternatively or additionally, the difference frames may be B-frames. The production of the zero difference frames, also referred to herein as ZP-frames, is described in more detail hereinbelow, as well as with reference to FIG. 4. Typically, frame combiner 88 selects the number and size of each of the ZP-frames so that a final output of generator 18 is at a fixed, controlled, bit rate. Alternatively, the bit rate may be allowed to vary as long as the highest varied bit rate is below a normal play speed bit rate. In order to determine the number and size of the ZP-frames following a specific I-frame, PU 28 takes into account:

The size of the I-frame.
The period of the frames. For a standard replay frame rate of 25 frames per second the period is 40 ms.
The sign of the scale factor received from the scaled PLAY command. Fast forward button 27 generates a scale factor having a positive value. Fast reverse button 29 generates a scale factor having a negative value.
The bit rate.

Combiner 88 comprises a P-frame generator 90, a P-frame header block 92, and a ZP-frame buffer 93. In P-frame generator 90, PU 28 receives P-frame headers from P-header block 92. Using the headers, in generator 90 PU 28 forms ZP-frames, and stores the ZP-frames in ZP-frame buffer 93. It will be appreciated that ZP-frames may be formed in varying sizes, using padding bits, and are typically of the order of 300-2000 bytes in size. PU 28 selects the number and size of the ZP-frames, so that when they follow the I-frame for which they are constructed, the predetermined fixed bit rate of the generated stream is maintained, and buffer 25 of the receiver's decoder neither underflows nor overflows.

Typically, I-frames stored in file 17 are separated by approximately 1 second. In one embodiment of the present invention, combiner 88 typically injects two ZP-frames between successive I-frames, generating for frames of 40 ms period a scale factor of approximately 8. Combiner 88 is typically configured to vary the actual number of ZP-frames injected to be from zero up, so that the buffer model imposed by the MPEG standard will neither underflow nor overflow.

In an alternative embodiment of the present invention, PU 28 also takes into account the numerical value of the scale factor, and varies the number of ZP-frames injected between successive I-frames accordingly.

Frame combiner 88 transfers its generated sequence of I-frames interspersed with zero or more ZP-frames as a video stream, hereinbelow termed the trick replay sequence, to a transport stream/program stream multiplexer 74.

Multiplexer 74 embeds the video stream in a system layer, and transfers the embedded data as an enhanced perceived rate sequence to module 75 for transmission to network 20. Optionally, multiplexer 74 also embeds audio data from file 19 in the system layer, to simulate a fast forward or reverse sound.

FIG. 4 is a flowchart 100 showing steps performed by PU 28 in forming the enhanced perceived rate sequence generated by multiplexer 74, according to an embodiment of the present invention.

In an initial step 102, PU 28 receives a trick replay request, herein assumed to be from decoder 22, in response to viewer 23 pressing fast forward or fast reverse buttons 27, 29. The request, in the form of a scaled PLAY command, is for a frame sequence which is to be viewed at an enhanced perceived rate at receiver 21. PU 28 then toggles switch 78 so that trick replay path 82 is operative.

In a second step 104, PU 28 determines the initial I-frame required by the trick replay request. Typically, the initial I-frame is determined from the last I-frame transmitted from path 80. If the scale factor received in the scaled PLAY command is positive, the initial I-frame is the I-frame subsequent to the last I-frame. If the scale factor received in the scaled PLAY command is negative, the initial I-frame is the I-frame preceding the last I-frame.

Alternatively, the scaled PLAY command may also comprise an I-frame sequence number, or a time in a movie being viewed, at which to commence the retrieval from file 17. This occurs, for example, if viewer 23 uses a scroll bar to request a fast forward or fast reverse sequence, rather than pressing fast forward button 27 or fast reverse button 29.

In a location step 106, PU 28 uses table 16 to locate the initial I-frame, and retrieves a sequence of I-frames, starting from the initial I-frame, from file 17. The retrieved sequence is transferred via temporary storage buffer 86 to combiner 88. The retrieved sequence is in ascending order if the scale factor is positive; the retrieved sequence is in descending order if the scale factor is negative.

In a size step 108, PU 28 measures the size of a first I-frame of the sequence. Alternatively, if the size of the I-frames has been stored in table 16, PU 28 reads the size from the table.

In a ZP-frame generation step 112, combiner 88 builds and stores a required number of ZP-frames. The number and the sizes of the ZP-frames, including the P-frame headers, are adjusted to correspond to the bit rate of generator 18. Typically, two ZP-frames are generated between consecutive I-frames.

In an output step 114, combiner 88 forwards the I-frame it is operating with, together with the ZP-frames built, to multiplexer 74. As shown by the dashed arrows to the beginning of step 106, combiner 88 then begins processing the subsequent I-frame in buffer 86 according to steps 106, 108, and 112. Multiplexer 74 processes its received frames and transmits the processed frames via module 75, as described above with reference to FIG. 3, to receiver 21 as a movie stream. Streaming continues until a subsequent command is received by PU 28, or until the input data stream to combiner 88 ends.

If a PAUSE signal is received from receiver 21 in a decision step 116, indicating imminent overflow of buffer 25, combiner 88 temporarily halts its processing of I-frames and generation of ZP-frames until a resume signal, indicating imminent underflow of buffer 25, is received from receiver 21. On receipt of a resume signal, combiner 88 resumes operation, or PU 28 toggles switch 78 to path 80, to resume normal play. If no PAUSE signal is received, flowchart 100 returns to the beginning of step 106.

Flowchart 100 repeats until all the I-frames for the trick replay sequence have been processed, at which point the flowchart ends. It will be appreciated that at least some of the steps of flowchart 100 may be at least partly performed in parallel, and/or in a different order. All such rearranged flowcharts are assumed to be within the scope of the present invention.

The inventors have found that the embodiments described above generate images that are visually pleasing to the eye, for video streams comprising progressive sequences. While the embodiments described above may be implemented for both progressive and interlaced pictures, those skilled in the art will appreciate that interlaced pictures may generate some unwanted video vibration. An embodiment of the present invention, described with reference to FIGS. 5A, 5B, 6A, and 6B below, generates trick replay video steams for interlaced pictures with no video vibration.

Typically, interlaced pictures may be encoded according to one of two methods:

a) one picture containing two fields, or b) two consecutive field pictures.

In the embodiment described with respect to FIGS. 5A, 5B, 6A, and 6B, it is assumed, by way of example, that an interlaced movie has a frame period of 40 ms and is stored according to method a) as file 15, and that file 17, comprising interlaced fields of the interlaced movie, is in the same format. It is further assumed that table 16 indexes the separate frames of file 17, and that PU 28 is able to use either interlaced field according to need. Those skilled in the art will be able to modify the following description to encompass other methods of storage of interlaced pictures, and other frame periods of the pictures. All such modifications are assumed to be comprised within the scope of the present invention.

In FIGS. 5A, 5B, 6A, and 6B, it is assumed that an I-frame 10 corresponds to a top interlaced field IF1 and a bottom interlaced field IF2, and that an I-frame 11 corresponds to a top interlaced field IF3 and a bottom interlaced field IF4.

FIG. 5B shows schematic timing diagrams of interlaced fields generated by frame combiner 88 for a fast forward trick replay sequence, according to an embodiment of the present invention. For comparison, in FIG. 5A a first timing diagram 120 shows frames generated by combiner 88 for a progressive fast forward trick replay sequence, where each frame has a period of 40 ms. In diagram 120, first I-frame I0 is followed by two substantially similar ZP-frames ZP0, generated in combiner 88 as described above with reference to FIGS. 3 and 4. Each ZP0 ZP-frame is a zero difference frame with respect to I-frame 10. The second ZP-frame ZP0 is followed by second I-frame 11, which is in turn followed by two ZP-frames ZP1.

Since file 15 and file 17 comprise interlaced pictures, I0 corresponds to a first pair of interlaced intracoded fields IF1 and IF2, each having a period of 20 ms, as shown in timing diagram 122. Since diagram 122 represents a fast forward sequence, IF1 is followed by IF2. To initiate formation of the fast forward sequence, table 16 is used to locate the first interlaced fields IF1 and IF2. Diagram 122 shows an upper interlaced set 124 of top fields and a lower interlaced set 126 of bottom fields produced by combiner 88. Herein, by way of example, it is assumed that the top fields precede the bottom fields in the time line.

In set 126 combiner 88 forms second interlaced fields 132 and 134 as zero difference ZP-frames with respect to field IF2. However, rather than forming first interlaced fields 128 and 130 of set 124 as zero difference ZP-frames with respect to field IF1, which would typically lead to video vibration, combiner 88 is implemented, by methods which will be apparent to those skilled in the art, to form fields 128 and 130 as zero difference. ZP-frames with respect to field IF2. Fields 128, 130, 132, and 134 are thus all labeled ZP2 fields.

A second pair of interlaced intracoded fields IF3 and IF4 correspond to second I-frame 11. As for fields IF1 and IF2, combiner 88 forms both the upper and lower sets of interlaced frames following intracoded fields IF3 and IF4 as zero difference ZP-frames with respect to IF4. For clarity, all the fields following IF4 are thus labeled as ZP4.

Once interlaced sets 124 and 126 have been generated by combiner 88, they are processed in replay generator 18, substantially as described above with respect to FIGS. 3 and 4.

It will be appreciated from inspection of timing diagram 122 that the sequence of ZP-frames inserted after field IF2 have the same zero difference, i.e., a zero difference with respect to IF2. There is no time anomaly in the progression of frames in the intracoded fields and the following sequence of ZP-frames, since each subsequent image is either of a later scene or of a scene of the same time, never a scene at an earlier time. There is thus no video vibration in viewing the IF1, IF2, and the ZP2 frames. Similarly, the sequence of ZP-frames inserted after IF4 have the same zero difference with respect to IF4 and there are no anomalous frames, so that there is no video vibration viewing IF3, IF4 and the ZP4 frames. Consequently, there is no video vibration viewing interlaced fast forward trick replay sequences generated according to the method described herein.

Figure 6A:
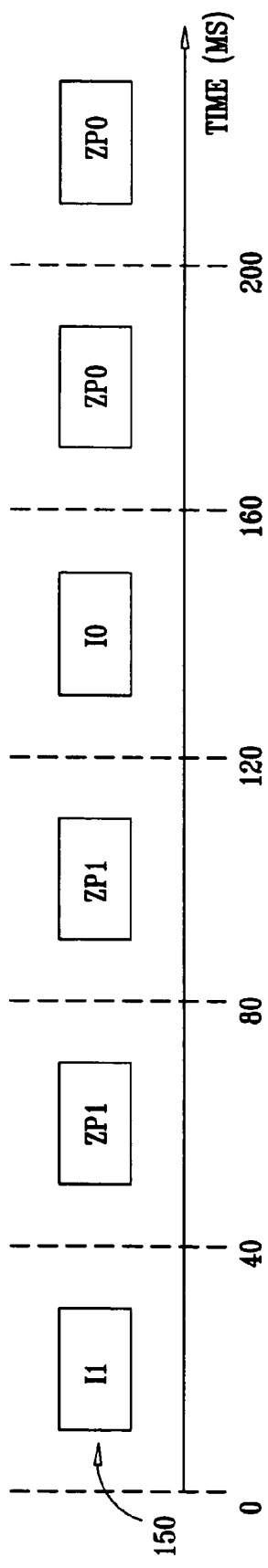
FIGS. 6A and 6B show schematic timing diagrams of interlaced and non-interlaced frames generated for a fast reverse trick replay sequence, according to an embodiment of the present invention.
Figure 6B:
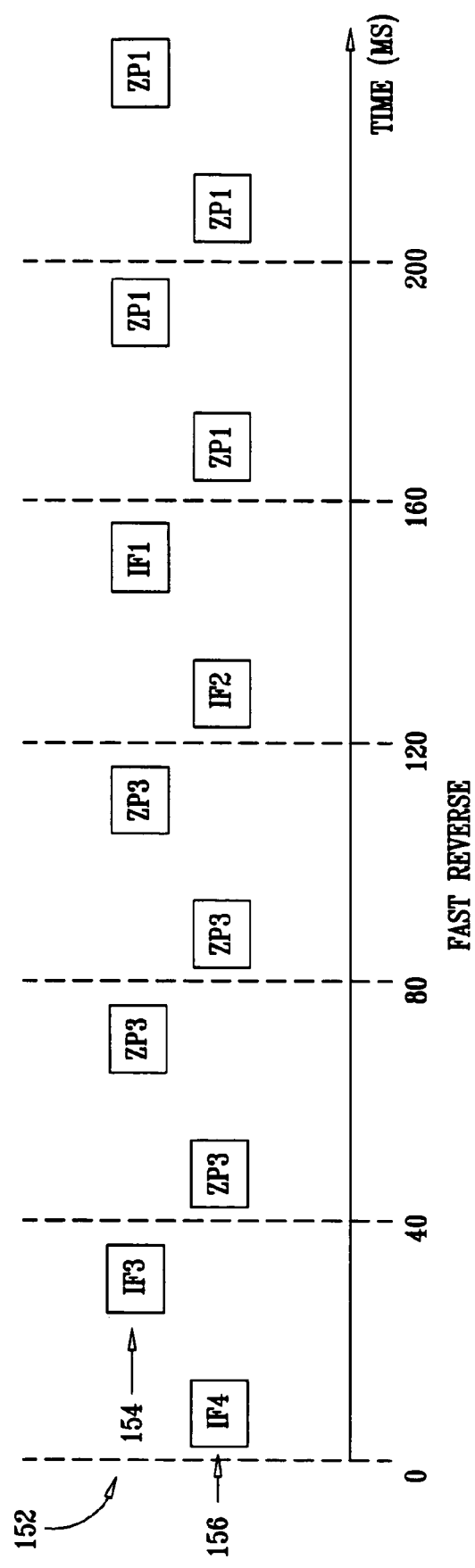

FIG. 6B shows schematic timing diagrams of interlaced fields generated by frame combiner 88 for a fast reverse trick replay sequence, according to an embodiment of the present invention. For comparison, in FIG. 6A a timing diagram 150 shows frames generated by combiner 88 for progressive video, for a fast reverse sequence. I-frame I1 is followed by two substantially similar ZP-frames ZP1. Each ZP1 ZP-frame is a zero difference frame with respect to I-frame I1. The second ZP-frame ZP1 is followed by a new I-frame I0, which is in turn followed by two ZP-frames ZP0.

In the corresponding interlaced case illustrated by timing diagram 152, since the diagram corresponds to a fast reverse sequence, in the time period of 0-40 ms field IF4 is implemented to be before field IF3 (in contrast to the process illustrated by FIG. 5B, where in the time period of 120-160 ms field IF4 was after field IF3). Similarly, IF2 is before IF1. Diagram 152 shows an upper interlaced set 154 of fields and a lower interlaced set 156 of fields.

In generating the ZP-frames corresponding to the ZP1 frames, combiner 88 generates the sequence of interlaced fields after IF3 to have zero difference with respect to IF3. These fields are consequently labeled ZP3. Similarly, in generating the ZP-frames corresponding to the ZP0 frames, combiner 88 generates all the interlaced fields after IF1 to have zero difference with respect to IF1. These fields are thus labeled ZP1. After generation in combiner 88, sets 154 and 156 are processed in replay generator 18, as described above.

As for the fast forward trick replay sequence described with respect to FIGS. 5A and 5B, it will be appreciated from inspection of timing diagram 152 that for each sequence of interlaced intracoded fields followed by ZP-frames there are no frames having time anomalies. Each frame generated shows either an earlier scene, or a scene of the same time, never a later scene. There is thus no video vibration viewing interlaced fast reverse trick replay sequences generated according to the method described herein.

It will be appreciated that the embodiments described above simplify the generation of trick replay modes, by duplicating some of the video data comprised in file 15 in a separate file 17. In some of the alternative embodiments of the present invention described below, there is no generation of a separate file 17.

Figure 7:
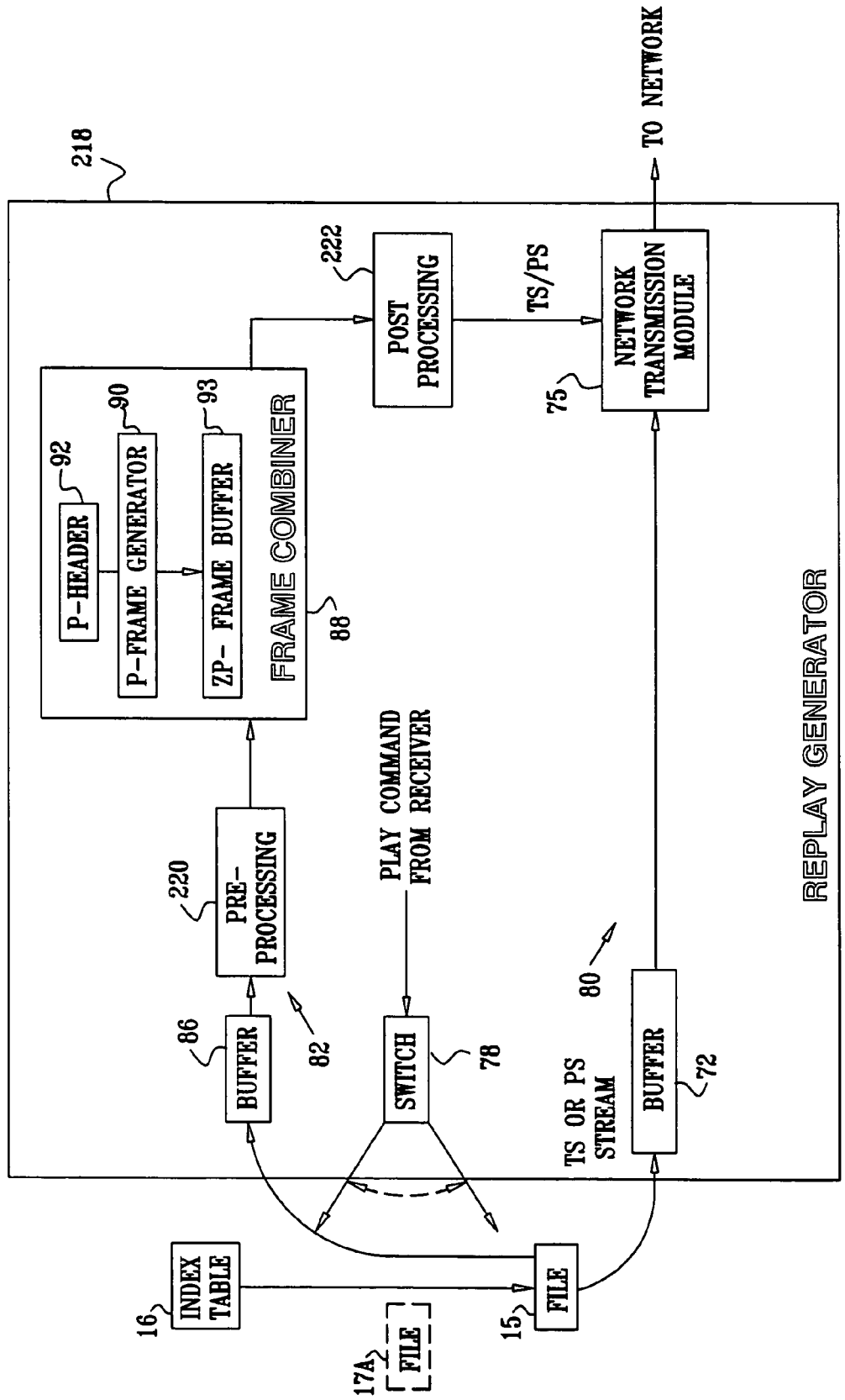
FIG. 7 is a schematic simplified block diagram of a replay generator, according to an alternative embodiment of the present invention.

FIG. 7 is a schematic simplified block diagram of a replay generator 218, according to an alternative embodiment of the present invention. Apart from the differences described below, the operation of replay generator 218 is generally similar to that of generator 18 (FIG. 3), such that elements indicated by the same reference numerals in both generators 18 and 218 are substantially similar in operation. As described below, generator 218 may be used in place of generator 18 in system 12.

In using generator 218, rather than generating and indexing a separate file 17, as described above with respect to FIG. 2, PU 28 indexes file 15 so that table 16 comprises the sequence numbers of each of the I-frames of file 15, and corresponding locations of their beginnings and ends in the file. In a further alternative embodiment of the present invention using generator 218, described further below, PU 28 generates and indexes a separate file 17A. The immediately following description of generator 218 assumes that neither file 17 nor file 17A are used.

In following trick replay path 82, PU 28 performs preprocessing, described below with reference to FIG. 8, in a preprocessing block 220, on data retrieved from file 15. The pre-processing maintains a structure, a system layer, and offsets of the I-frames extracted from file 15, before transferring the pre-processed data to frame combiner 88.

Combiner 88 generates one or more ZP-frames, substantially as described above with respect to FIG. 3, as well as performing steps described below with reference to FIG. 8.

In a post-processing block 222, PU 28 adds or updates, as necessary, time stamps for the data stream generated by combiner 88.

FIG. 8 is a flowchart 300 showing steps performed by PU 28 in operating generator 218, according to an embodiment of the present invention. The steps described herein assume that file 15 corresponds to a transport stream (TS) encoded movie. Those skilled in the art will be able to adapt the steps if file 15 is a PS encoded movie. Some of the steps of flowchart 300 are generally similar to steps of flowchart 100, as is the general process described by flowchart 300, wherein ZP-frames are inserted between successive I-frames.

Initial steps 302 and 304 are substantially as described for steps 102 and 104 respectively, of flowchart 100 (FIG. 4).

In a location step 306, PU 28 uses table 16 to locate the initial I-frame, and retrieves a stream of data, starting from and including the initial I-frame, from file 15. It will be understood that while the retrieved stream includes the data corresponding to the I-frames, this data is not contiguous, and has other data, such as system and audio data, interleaved with I-frame data. Each I-frame is thus in the form of a number of sections. The retrieved stream is transferred via temporary storage buffer 86 to pre-processor 220. The retrieved stream is in ascending I-frame order if the scale factor is positive; the retrieved stream is in descending order if the scale factor is negative.

In a first pre-processing step 308, for each I-frame comprised in the received data stream, PU 28 reads the aligned packet preceding the I-frame, so as to be able to build a TS packet containing the start of the I-frame, and places a prefix header before the first I-frame section, as is required for the video stream being generated. PU 28 then recreates and applies the PES header prefixing the video stream.

In a second pre-processing step 310, PU 28 adds stuffing bits, comprising zero values, to the beginning and the end of each I-frame, to align the packets associated with the I-frame. PU 28 also replaces/removes unnecessary data packets interleaved with the I-frame with packets containing zero values, although it will be appreciated that only unnecessary data should be replaced/removed, and that some non-video data may need to be left for correct display of the I-frames.

In a final pre-processing step 311, PU 28 removes the original program clock reference (PCR) timestamps, and, adjusts the I-frame temporal reference and a video buffer verifier delay. PU 28 then forwards the preprocessed data, comprising I-frames embedded in a system layer to combiner 88.

A ZP-frame generation step 312 corresponds substantially to ZP-frame generation step 112, (FIG. 4). In addition, combiner 88 embeds the ZP-frames in the system layer and, if necessary, adjusts the frame time and counter. Corresponding to post-processing block 222, PU 28 then adds or updates, as necessary, time stamps for the data stream generated by combiner 88, and transfers the stream to module 75 for transmission to the network.

A decision step 316 is substantially similar to decision step 116 of flowchart 100.

It will be appreciated that embodiments of the present invention implemented according to those described above for FIGS. 7 and 8 do not duplicate data stored in file 15, and thus conserve disk space.

In the further alternative embodiment of the present invention referred to above, in the processing corresponding to flowchart 40 (FIG. 2), PU 28 stores the parts of file 15 containing the I-frames as a separate file 17A in storage medium 14. It will be understood that whereas file 17 comprises substantially only I-frame data, file 17A comprises other data apart from the I-frame data. In preparing file 17A, PU 28 indexes the beginning and ends of the I-frames, as described above with reference to FIG. 7, and stores the indexes in table 16. In generating trick replay modes, PU 28 uses table 16 and file 17A, substantially as described above with respect to FIGS. 7 and 8.

It will be appreciated that embodiments of the present invention that use files 17 or 17A may reduce the number of disk seeks compared to embodiments that do not use these files.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for generating a trick replay video stream, comprising:
    selecting from stored data adapted for transmission as a streamed movie a sequence of Intracoded frames (I-frames);
    inserting one or more difference frames between consecutive I-frames of the sequence to form the trick replay video stream, each of the difference frames having a zero difference with respect to a preceding I-frame in the sequence; and
    transmitting the trick replay video stream to a decoder for display of the streamed movie at an enhanced perceived rate,
    and comprising performing the steps of selecting the sequence, inserting the one or more difference frames, and transmitting the trick replay video stream in response to a command from the decoder.

2. The method according to claim 1, wherein the command comprises a scale factor indicative of the enhanced perceived rate.

3. The method according to claim 2, and comprising determining a number of the one or more difference frames in response to the scale factor.

4. The method according to claim 1, wherein the trick replay video stream comprises a choice of a fast forward sequence and a fast reverse sequence, and wherein the command comprises a parameter indicative of the choice.

5. The method according to claim 1, and comprising transmitting the trick replay video stream at a controlled rate.

6. The method according to claim 1, wherein inserting the one or more difference frames comprises determining a number of the difference frames in response to a bit rate of transmission of the trick replay video stream.

7. The method according to claim 1, wherein selecting the sequence of I-frames comprises generating a table indicative of locations of the I-frames, and reading the table to locate the sequence.

8. The method according to claim 1, wherein the one or more difference frames are selected from at least one predictive frame (P-frame) and at least one bidirectional frame (B-frame).

9. The method according to claim 1, wherein the stored data comprises a plurality of I-frames, and comprising processing an initial movie to generate the plurality of the I-frames and to generate respective indexes of the I-frames.

10. The method according to claim 9, wherein selecting the stored data comprises referring to the indexes of the I-frames.

11. A method for generating a trick replay video stream, comprising:
    selecting from stored data adapted for transmission as a streamed movie a sequence of Intracoded frames (I-frames);
    inserting one or more difference frames between consecutive I-frames of the sequence to form the trick replay video stream, each of the difference frames having a zero difference with respect to a preceding I-frame in the sequence; and
    transmitting the trick replay video stream to a decoder for display of the streamed movie at an enhanced perceived rate,
    wherein inserting the one or more difference frames comprises determining a number of the difference frames in response to a size of the preceding I-frame.

12. A method for generating a trick replay video stream, comprising:
    selecting from stored data adapted for transmission as a streamed movie a sequence of Intracoded frames (I-frames);
    inserting one or more difference frames between consecutive I-frames of the sequence to form the trick replay video stream, each of the difference frames having a zero difference with respect to a preceding I-frame in the sequence; and
    transmitting the trick replay video stream to a decoder for display of the streamed movie at an enhanced perceived rate,
    and comprising adding a prerecorded trick replay audio stream to the trick replay video stream to form a combined stream, and wherein transmitting the trick replay video stream comprises transmitting the combined stream to the decoder.

13. A method for generating a trick replay video stream, comprising:
    selecting from stored data adapted for transmission as a streamed movie a sequence of Intracoded frames (I-frames);
    inserting one or more difference frames between consecutive I-frames of the sequence to form the trick replay video stream, each of the difference frames having a zero difference with respect to a preceding I-frame in the sequence; and
    transmitting the trick replay video stream to a decoder for display of the streamed movie at an enhanced perceived rate,
    wherein inserting the one or more difference frames comprises determining a number of the difference frames in response to a buffer comprised in the decoder.

14. A method for generating a trick replay video stream, comprising:
    selecting from stored data adapted for transmission as a streamed movie a sequence of Intracoded frames (I-frames);
    inserting one or more difference frames between consecutive I-frames of the sequence to form the trick replay video stream, each of the difference frames having a zero difference with respect to a preceding I-frame in the sequence; and
    transmitting the trick replay video stream to a decoder for display of the streamed movie at an enhanced perceived rate,
    wherein each of the I-frames comprises a first interlaced field and a second interlaced field, and wherein inserting the one or more difference frames comprises inserting a sequence of interlaced difference frames having a zero difference with respect to one of the first and the second interlaced fields, and
    wherein the first interlaced field is displayed before the second interlaced field, and wherein inserting the sequence of interlaced difference frames comprises:
    inserting a single first difference frame having a zero difference with respect to the second interlaced field after the second interlaced field; and
    inserting one or more consecutive difference frames having a zero difference with respect to the second interlaced field after the single first difference frame.

15. A method for generating a trick replay video stream, comprising:
    selecting from stored data adapted for transmission as a streamed movie a sequence of Intracoded frames (I-frames);

inserting one or more difference frames between consecutive I-frames of the sequence to form the trick replay video stream, each of the difference frames having a zero difference with respect to a preceding I-frame in the sequence; and transmitting the trick replay video stream to a decoder for display of the streamed movie at an enhanced perceived rate, wherein each of the I-frames comprises a first interlaced field and a second interlaced field, and wherein inserting the one or more difference frames comprises inserting a sequence of interlaced difference frames having a zero difference with respect to one of the first and the second interlaced fields, and wherein the first interlaced field is displayed after the second interlaced field, and wherein inserting the sequence of interlaced difference frames comprises:

inserting a single first difference frame having a zero difference with respect to the first interlaced field after the first interlaced field; and inserting one or more consecutive difference frames having a zero difference with respect to the first interlaced field after the single first difference frame.

16. Apparatus for generating a trick replay video stream, comprising:

a storage medium wherein is stored data adapted for transmission as a streamed movie; and a processor which is adapted to:

select from the stored data a sequence of Intracoded frames (I-frames), insert one or more difference frames between consecutive I-frames of the sequence to form the trick replay video stream, each of the difference frames having a zero difference with respect to a preceding I-frame in the sequence, and transmit the trick replay video stream to a decoder for display of the streamed movie at an enhanced perceived rate, wherein the processor is adapted to perform the steps of selecting the sequence, inserting the one or more difference frames, and transmitting the trick replay video stream in response to a command from the decoder.

17. The apparatus according to claim 16, wherein the command comprises a scale factor indicative of the enhanced perceived rate.

18. The apparatus according to claim 17, and comprising determining a number of the one or more difference frames in response to the scale factor.

19. The apparatus according to claim 16, wherein the trick replay video stream comprises a choice of a fast forward sequence and a fast reverse sequence, and wherein the command comprises a parameter indicative of the choice.

20. The apparatus according to claim 16, wherein the processor is adapted to transmit the trick replay video stream at a controlled rate.

21. The apparatus according to claim 16, wherein inserting the one or more difference frames comprises determining a number of the difference frames in response to a bit rate transmission of the trick replay video stream.

22. The apparatus according to claim 16, wherein selecting the sequence of I-frames comprises storing a table indicative of locations of the I-frames in the storage medium, and wherein the processor is adapted to read the table to locate the sequence.

23. The apparatus according to claim 16, wherein the one or more difference frames are selected from at least one predictive frame (P-frame) and at least one bidirectional frame (B-frame).

24. The apparatus according to claim 16, wherein the stored data comprises a plurality of I-frames, and wherein the processor is adapted to process an initial movie to generate the plurality of the I-frames and to generate respective indexes of the I-frames.

25. The apparatus according to claim 24, wherein selecting the stored data comprises referring to the indexes of the I-frames.

26. Apparatus for generating a trick replay video stream, comprising:

a storage medium wherein is stored data adapted for transmission as a streamed movie; and a processor which is adapted to:

select from the stored data a sequence of Intracoded frames (I-frames), insert one or more difference frames between consecutive I-frames of the sequence to form the trick replay video stream, each of the difference frames having a zero difference with respect to a preceding I-frame in the sequence, and transmit the trick replay video stream to a decoder for display of the streamed movie at an enhanced perceived rate, wherein the processor is adapted to add a prerecorded trick replay audio stream to the trick replay video stream to form a combined stream, and wherein transmitting the trick replay video stream comprises transmitting the combined stream to the decoder.

27. Apparatus for generating a trick replay video stream, comprising:

a storage medium wherein is stored data adapted for transmission as a streamed movie; and a processor which is adapted to:

select from the stored data a sequence of Intracoded frames (I-frames), insert one or more difference frames between consecutive I-frames of the sequence to form the trick replay video stream, each of the difference frames having a zero difference with respect to a preceding I-frame in the sequence, and transmit the trick replay video stream to a decoder for display of the streamed movie at an enhanced perceived rate, wherein inserting the one or more difference frames comprises determining a number of the difference frames in response to a buffer comprised in the decoder.

28. Apparatus for generating a trick replay video stream, comprising:

a storage medium wherein is stored data adapted for transmission as a streamed movie; and a processor which is adapted to:

select from the stored data a sequence of Intracoded frames (I-frames), insert one or more difference frames between consecutive I-frames of the sequence to form the trick replay video stream, each of the difference frames having a zero difference with respect to a preceding I-frame in the sequence, and transmit the trick replay video stream to a decoder for display of the streamed movie at an enhanced perceived rate, wherein each of the I-frames comprises a first interlaced field and a second interlaced field, and wherein inserting the one or more difference frames comprises inserting a sequence of interlaced difference frames having a zero difference with respect to one of the first and the second interlaced fields, and wherein the first interlaced field is displayed before the second interlaced field, and wherein inserting the sequence of interlaced difference frames comprises:

inserting a single first difference frame having a zero difference with respect to the second interlaced field after the second interlaced field; and inserting one or more consecutive difference frames having a zero difference with respect to the second interlaced field after the single first difference frame.

29. Apparatus for generating a trick replay video stream, comprising:

a storage medium wherein is stored data adapted for transmission as a streamed movie; and a processor which is adapted to:

select from the stored data a sequence of Intracoded frames (I-frames), insert one or more difference frames between consecutive I-frames of the sequence to form the trick replay video stream, each of the difference frames having a zero difference with respect to a preceding I-frame in the sequence, and transmit the trick replay video stream to a decoder for display of the streamed movie at an enhanced perceived rate, wherein each of the I-frames comprises a first interlaced field and a second interlaced field, and wherein inserting the one or more difference frames comprises inserting a sequence of interlaced difference frames having a zero difference with respect to one of the first and the second interlaced fields, and wherein the first interlaced field is displayed after the second interlaced field, and wherein inserting the sequence of interlaced difference frames comprises:

inserting a single first difference frame having a zero difference with respect to the first interlaced field after the first interlaced field; and inserting one or more consecutive difference frames having a zero difference with respect to the first interlaced field after the single first difference frame.

30. Apparatus for generating a trick replay video stream, comprising:

a storage medium wherein is stored data adapted for transmission as a streamed movie; and a processor which is adapted to:

select from the stored data a sequence of Intracoded frames (I-frames), insert one or more difference frames between consecutive I-frames of the sequence to form the trick replay video stream, each of the difference frames having a zero difference with respect to a preceding I-frame in the sequence, and transmit the trick replay video stream to a decoder for display of the streamed movie at an enhanced perceived rate, wherein inserting the one or more difference frames comprises determining a number of the difference frames in response to a size of the preceding I-frame.

* * * * *